US008675800B2

United States Patent
Futami et al.

(10) Patent No.: US 8,675,800 B2
(45) Date of Patent: Mar. 18, 2014

(54) SYNCHRONIZING CIRCUIT, SYNCHRONIZING METHOD, AND RECEIVING SYSTEM

(75) Inventors: Tetsuhiro Futami, Kanagawa (JP); Ikko Okamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 343 days.

(21) Appl. No.: 13/238,093

(22) Filed: Sep. 21, 2011

(65) Prior Publication Data

US 2012/0076252 A1    Mar. 29, 2012

(30) Foreign Application Priority Data

Sep. 29, 2010  (JP) ................................. 2010-219644

(51) Int. Cl.
*H03D 3/24*   (2006.01)

(52) U.S. Cl.
USPC ........... 375/376; 375/375; 375/374; 375/373; 375/327; 375/371; 327/147; 327/156; 327/150; 327/159; 455/260; 455/265

(58) Field of Classification Search
USPC ................ 375/376, 375, 374, 373, 327, 371; 327/147, 156, 150, 159; 455/260, 265
See application file for complete search history.

(56) References Cited

U.S. PATENT DOCUMENTS

| | | | | |
|---|---|---|---|---|
| 6,064,869 | A * | 5/2000 | Davis et al. | 455/260 |
| 6,667,663 | B2 * | 12/2003 | Ozawa | 331/17 |
| 8,406,366 | B2 * | 3/2013 | Hattori et al. | 375/376 |
| 8,461,885 | B2 * | 6/2013 | Nguyen et al. | 327/156 |
| 2003/0119466 | A1 * | 6/2003 | Goldman | 455/260 |
| 2005/0250464 | A1 * | 11/2005 | Spencer et al. | 455/260 |
| 2006/0269032 | A1 * | 11/2006 | Takahashi | 375/376 |
| 2009/0028017 | A1 | 1/2009 | Sano | |

FOREIGN PATENT DOCUMENTS

JP   2009-26426   2/2009

* cited by examiner

*Primary Examiner* — Phuong Phu
(74) *Attorney, Agent, or Firm* — Oblon, Spivak, McClelland, Maier & Neustadt, L.L.P.

(57) ABSTRACT

Disclosed herein is a synchronizing circuit including: a first PLL circuit; a second PLL circuit; a first output circuit; a second output circuit; a first detection circuit; a second detection circuit; a control circuit; and a holding section.

11 Claims, 10 Drawing Sheets

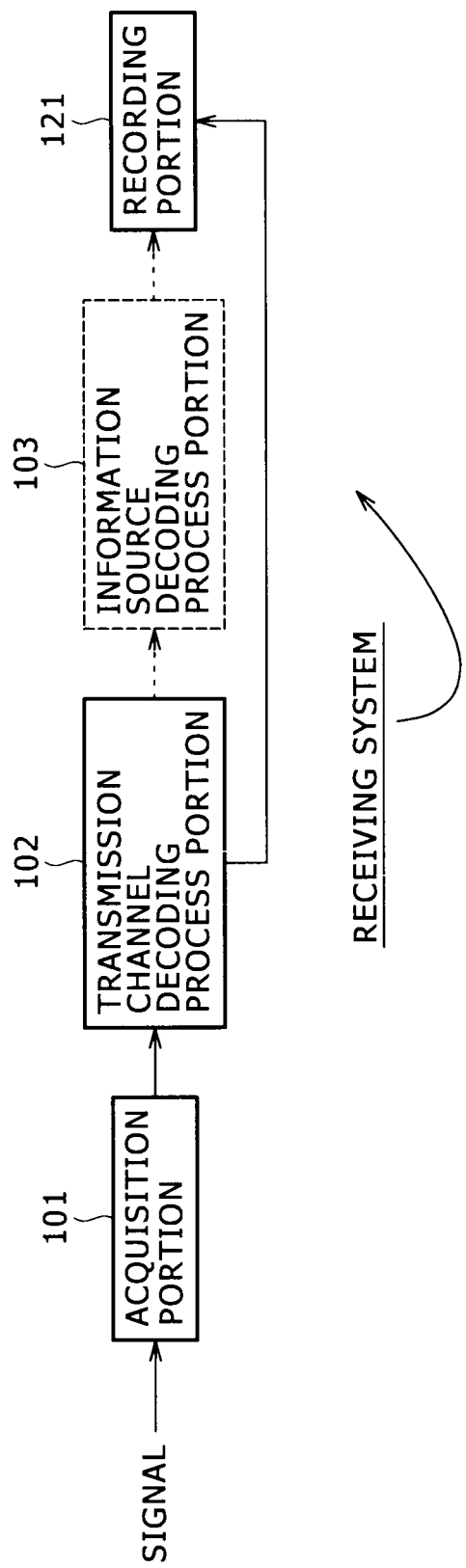

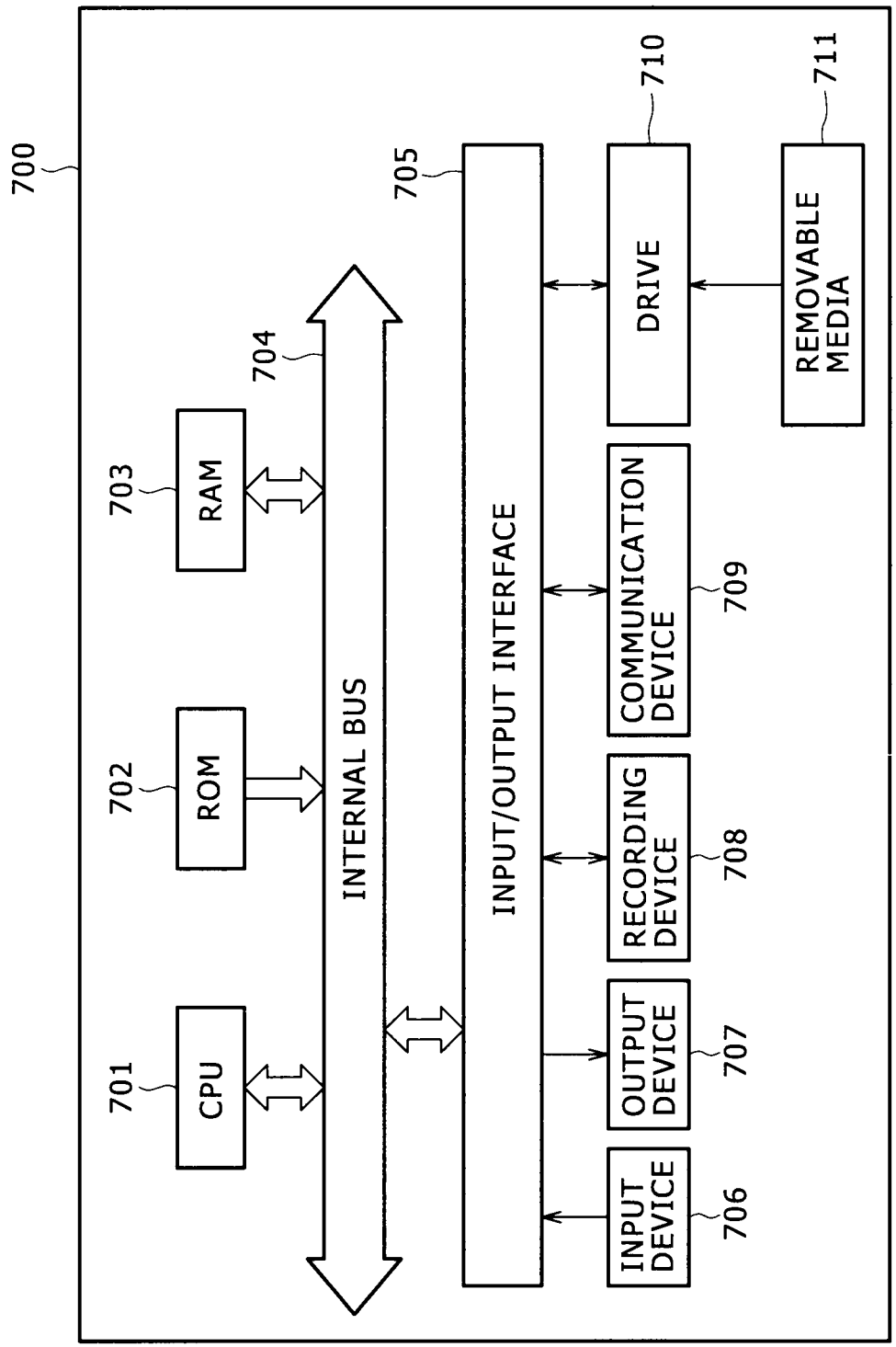

SYNCHRONIZING CIRCUIT, SYNCHRONIZING METHOD, AND RECEIVING SYSTEM

BACKGROUND

The present disclosure relates to a synchronizing circuit, a synchronizing method, and a receiving system. More particularly, the disclosure relates to a synchronizing circuit, a synchronizing method, and a receiving system capable of searching for optimum loop gains in keeping with the individual differences between receivers and the time jitter over transmission channels, even where a plurality of modulation techniques are used in a transmission frame.

The recent years have witnessed phenomenal progress in wireless digital transmission technologies including mobile phones, digital broadcasts (satellite and terrestrial), and wireless LAN's.

With regard to the receiver used for wireless digital transmission, for example, the performance of each synchronizing circuit making up the receiver structure is important in realizing enhanced reception performance. In particular, the synchronization performance of a carrier frequency/phase synchronizing circuit directly affects bit errors and is thus critically important for the reception performance of the receiver.

A representative frequency/phase synchronizing circuit may be the digital PLL (phase-locked loop).

The frequency/phase synchronizing circuit that uses the digital PLL is generally composed of a phase error detector, a loop filter, and a numerically controlled oscillator (NCO).

FIG. 1 is a schematic view showing a partial structure of an ordinary receiver that includes the frequency/phase synchronizing circuit utilizing the digital PLL.

As shown in FIG. 1, the receiver includes a radio frequency (RF) circuit 2 and a demodulation circuit 3. A reception signal obtained by an antenna 1 receiving radio waves is input to a multiplier 2-1 of the RF circuit 2.

The multiplier 2-1 multiplies a local oscillation signal supplied from a local oscillator 2-2 by the reception signal fed from the antenna 1. The signal obtained through multiplication is forwarded to a low-pass filter (LPF) 2-3.

The local oscillator 2-2 generates the local oscillation signal and outputs it to the multiplier 2-1.

The LPF 2-3 inputs the multiplication signal output from the multiplier 2-1 and allows only the low-frequency component of the signal to pass through in a filtering process. The signal having undergone the filtering process is output to an analog/digital (A/D) converter 2-4.

It is assumed here that reference character $f_c$ stands for the frequency of the reception signal having undergone modulation such as PSK (Phase Shift Keying), $\theta_c$ for the phase of the reception signal, $f_0$ for the frequency of the local oscillation signal generated by the local oscillator 2-2, and $\theta_0$ for the phase of the local oscillation frequency. On that assumption, the signal output from the LPF includes a frequency difference $\Delta f$ corresponding to $f_c$-$f_0$ and a phase difference $\theta$ corresponding to $\theta_c$-$\theta_0$.

The A/D converter 2-4 performs A/D conversion on the signal output from the LPF 2-3. The reception signal ri, which is a digital reception signal obtained through A/D conversion, is fed to the demodulation circuit 3. The reference character i denotes the ordinal position of the reception signal in question in the sequence of symbols.

The reception signal ri contains a phase error represented by $2\pi\Delta fi+\theta$.

FIG. 2 is a schematic view showing a typical structure of a frequency/phase synchronizing circuit that uses a digital PLL and that is furnished in the demodulation circuit 3 of FIG. 1.

As shown in FIG. 2, the frequency/phase synchronizing circuit is made up of a PLL circuit 11 and a multiplier 12. The PLL circuit 11 is composed of a multiplier 21, a phase error detector 22, a loop filter 23, and a numerically controlled oscillator (NCO) 24.

The reception signal ri having undergone PSK modulation is input to the multiplier 21 of the PLL circuit 11 and to the multiplier 12.

The multiplier 21 of the PLL circuit 11 multiplies the reception signal ri by a phase control amount $e^{-j(2\pi\Delta fi+\theta)}$ supplied from the numerically controlled oscillator 24. The signal obtained through multiplication is output to the phase error detector 22.

The phase error detector 22 detects a phase error that may remain in the signal output from the multiplier 21, and outputs the detected phase error to the loop filter 23.

For example, if the reception signal ri is the signal of a known symbol, the phase error detector 22 detects as the phase error the difference between the phase of a symbol represented by the output signal from the multiplier 21 and the phase of the known symbol. If the reception signal ri is not the signal of any known signal, the phase error detector 22 detects as the phase error the difference between the phase of the actual symbol represented by the output signal from the multiplier 21 and the phase of a symbol resulting from hard decision.

The loop filter 23 is a proportional integral loop filter that filters the detected phase error value supplied from the phase error detector 22. The filtered value is output to the numerically controlled oscillator 24.

More specifically, a multiplier 23-1 of the loop filter 23 multiplies the detected phase error value fed from the phase error detector 22 by a previously established loop gain G1. The result of the multiplication is output to a multiplier 23-2 and an adder 23-4.

The multiplier 23-2 multiplies the G1-fold detection value of the phase error fed from the multiplier 23-1 by a previously established loop gain G2. The result of the multiplication is output to an integrator 23-3. The multipliers 23-1 and 23-2 serve as a multiplier block that adds the weight of the loop gain G1 or G2 to the input signal.

The integrator 23-3 integrates the output from the multiplier 23-2, and outputs the result of the integration to the adder 23-4.

The adder 23-4 adds the output from the multiplier 23-1 and that from the multiplier 23-3. The sum of the addition is output as the result of the filtering process to the numerically controlled oscillator 24.

The numerically controlled oscillator 24 generates the phase control amount $e^{-j(2\pi\Delta fi+\theta)}$ based on the filtering result from the loop filter 23, and outputs the generated amount to the multipliers 21 and 12.

The multiplier 12 multiplies the reception signal ri by the phase control amount $e^{-j(2\pi\Delta fi+\theta)}$ output from the numerically controlled oscillator 24. The signal obtained through multiplication is output as a synchronized detection signal di.

Meanwhile, the loop gains G1 and G2 of the loop filter 23 determine the filtering bandwidth that characterizes the loop filter 23. The bandwidth of the loop filter 23 and the performance of the PLL circuit 11 are known to have the following relations therebetween:

That is, when the loop filter has a wide (i.e., large) bandwidth, the ability to follow phase error variation is improved but the amount of the jitter in the synchronized detection signal output from the PLL is increased. Conversely, where the loop filter has a narrow (i.e., small) bandwidth, the ability to follow phase error variation is worsened but the mount of the jitter in the output synchronized detection signal is reduced. In this respect, reference may be made to Japanese Patent Laid-open No. 2009-26426.

SUMMARY

In the receiver used for actual wireless digital transmission, however, noise may occur in the phase and frequency of the reception signal due to temperature-dependent characteristics of the local oscillator or unintended oscillation inside the RF circuit. In order to realize optimum synchronization performance of the frequency/phase synchronizing circuit using the digital PLL, it may thus be required to establish optimum loop gains in keeping with the individual differences of receiver characteristics and the time jitter over transmission channels.

The ordinary digital PLL is capable of having only a fixed loop gain established. To obtain optimum reception performance involves setting a loop gain optimally adjusted to the reception environment for every individual receiver. Where the transmission channels are dynamically changed due to temperature and other factors so that the optimum loop gain dynamically varies accordingly, the currently used loop gain may not remain optimal.

Furthermore, the optimum loop gain for the PLL-based loop filter may vary depending on the modulation techniques used in the reception signal. For example, the satellite digital broadcasting scheme adopted in Japan allows a plurality of modulation techniques to coexist in a single frame. In such a case, if only one loop gain can be established, that loop gain may be optimal for a given modulation technique but not so for the other modulation techniques. This can result in worsened reception performance.

The present disclosure has been made in view of the above circumstances and provides a synchronizing circuit, a synchronizing method, and a receiving system capable of searching for optimum loop gains in keeping with the individual differences between receivers and the time jitter over transmission channels, even where a plurality of modulation techniques are used in a transmission frame.

According to one embodiment of the present disclosure, there is provided a synchronizing circuit including: a first PLL circuit configured to output, based on an input reception signal, a first phase control signal representing a phase control amount of the reception signal; a second PLL circuit configured to input the same signal as the reception signal input to the first PLL circuit so as to output a second phase control signal representing the phase control amount of the reception signal; a first output circuit configured to control the phase of the reception signal based on the first phase control signal so as to output the phase-controlled signal; a second output circuit configured to control the phase of the reception signal based on the second phase control signal so as to output the phase-controlled signal; a first detection circuit configured to detect a phase control error in the first PLL circuit based on the phase-controlled signal output from the first output circuit; a second detection circuit configured to detect a phase control error in the second PLL circuit based on the phase-controlled signal output from the second output circuit; a control circuit configured such that if the phase control error detected in the first PLL circuit by the first detection circuit is larger than the phase control error detected in the second PLL circuit by the second detection circuit, then the control circuit establishes the same value as the loop gain of a second loop filter included in the second PLL circuit as the loop gain of a first loop filter included in the first PLL circuit; and a holding section configured to hold a loop gain setting established as the loop gain of the first loop filter included in the first PLL circuit. The reception signal is structured in units of a frame made up of a plurality of slots transmitted in a plurality of transmission modes corresponding to different modulation techniques, and the holding section holds the loop gain setting for each of the transmission modes.

Preferably, the synchronizing circuit of the present disclosure may further include: a comparison section configured to compare in magnitude the phase control error detected in the first PLL circuit by the first detection circuit with the phase control error detected in the second PLL circuit by the second detection circuit; and a loop gain search section configured such that every time the comparison is made by the comparison section during input of the reception signal corresponding to the slots of a designated transmission mode, the loop gain search section searches for an optimum loop gain setting for the transmission mode by changing by a predetermined amount the loop gain value of the second loop filter included in the second PLL circuit. If the loop gain value of the second loop filter is changed a predetermined number of times by the loop gain search section, then the holding section may hold the value established as the loop gain of the first loop filter as the optimum loop gain setting for the transmission mode.

Preferably, the synchronizing circuit of the present disclosure may further include a transmission mode number identification section configured to identify a transmission mode number constituting information for identifying the transmission mode of each of the slots in the reception signal, based on control signal obtained by decoding the reception signal. If the identified transmission mode number corresponds to the designated transmission mode, then the loop gain search section may search for the optimum loop gain setting; and the holding section may hold the optimum loop gain setting in correspondence with the transmission mode number identified by the transmission mode number identification section.

Preferably, the first PLL circuit may include: a first detection circuit configured to detect a phase error remaining in the phase-controlled signal; the first loop filter configured to perform a filtering process on the phase error detected by the first detection circuit; a first oscillation circuit configured to output the first phase control signal depending on the result of the filtering process performed by the first loop filter; and a first output circuit configured to control the phase of the reception signal based on the first phase control signal output from the first oscillation circuit, the first output circuit further outputting the phase-controlled signal to the first detection circuit as a signal targeted for phase error detection; and the second PLL circuit may include: a second detection circuit configured to detect a phase error remaining in the phase-controlled signal; the second loop filter configured to perform a filtering process on the phase error detected by the second detection circuit; a second oscillation circuit configured to output the second phase control signal depending on the result of the filtering process performed by the second loop filter; and the second output circuit configured to control the phase of the reception signal based on the second phase control signal output from the second oscillation circuit, the second output circuit further outputting the phase-controlled signal to the second detection circuit as a signal targeted for phase error detection.

Preferably, the first loop filter may include: a first multiplication circuit configured to multiply the phase error detected by the first detection circuit by a first loop gain; a second multiplication circuit configured to multiply the phase error multiplied by the first multiplication circuit by a second loop gain; and a first addition circuit configured to add the phase error multiplied by the first multiplication circuit and the result of integrating the phase error multiplied by the second multiplication circuit, the first addition circuit further outputting the sum of the addition to the first oscillation circuit; and the second loop filter may include: a third multiplication circuit configured to multiply the phase error detected by the second detection circuit by third loop gain; a fourth multiplication circuit configured to multiply the phase error multiplied by the third multiplication circuit by a fourth loop gain; and a second addition circuit configured to add the phase error multiplied by the third multiplication circuit and the result of integrating the phase error multiplied by the fourth multiplication circuit, the second addition circuit further outputting the sum of the addition to the second oscillation circuit.

Preferably, the control circuit may establish a different value for each of the first loop gain and the third loop gain.

According to another embodiment of the present disclosure, there is provided a synchronizing method including: causing a first PLL circuit to output, based on an input reception signal, a first phase control signal representing a phase control amount of the reception signal; causing a second PLL circuit to input the same signal as the reception signal input to the first PLL circuit so as to output a second phase control signal representing the phase control amount of the reception signal; causing a first output circuit to control the phase of the reception signal based on the first phase control signal so as to output the phase-controlled signal; causing a second output circuit to control the phase of the reception signal based on the second phase control signal so as to output the phase-controlled signal; causing a first detection circuit to detect a phase control error in the first PLL circuit based on the phase-controlled signal output from the first output circuit; causing a second detection circuit to detect a phase control error in the second PLL circuit based on the phase-controlled signal output from the second output circuit; if the phase control error detected in the first PLL circuit by the first detection circuit is larger than the phase control error detected in the second PLL circuit by the second detection circuit, then establishing the same value as the loop gain of a second loop filter included in the second PLL circuit as the loop gain of a first loop filter included in the first PLL circuit; and holding a loop gain setting established as the loop gain of the first loop filter included in the first PLL circuit. The reception signal is structured in units of a frame made up of a plurality of slots transmitted in a plurality of transmission modes corresponding to different modulation techniques; and the loop gain setting is held for each of the transmission modes.

According to a further embodiment of the present disclosure, there is provided a reception system including: an acquisition section configured to acquire a signal transmitted via a transmission channel; and a transmission channel decoding process section configured to perform processing including a synchronized detection process on the signal acquired by the acquisition section. The transmission channel decoding process section includes: a first PLL circuit configured to output, based on an input reception signal, a first phase control signal representing a phase control amount of the reception signal; a second PLL circuit configured to input the same signal as the reception signal input to the first PLL circuit so as to output a second phase control signal representing the phase control amount of the reception signal; a first output circuit configured to control the phase of the reception signal based on the first phase control signal so as to output the phase-controlled signal; a second output circuit configured to control the phase of the reception signal based on the second phase control signal so as to output the phase-controlled signal; a first detection circuit configured to detect a phase control error in the first PLL circuit based on the phase-controlled signal output from the first output circuit; a second detection circuit configured to detect a phase control error in the second PLL circuit based on the phase-controlled signal output from the second output circuit; a control circuit configured such that if the phase control error detected in the first PLL circuit by the first detection circuit is larger than the phase control error detected in the second PLL circuit by the second detection circuit, then the control circuit establishes the same value as the loop gain of a second loop filter included in the second PLL circuit as the loop gain of a first loop filter included in the first PLL circuit; and a holding section configured to hold a loop gain setting established as the loop gain of the first loop filter included in the first PLL circuit. The reception signal is structured in units of a frame made up of a plurality of slots transmitted in a plurality of transmission modes corresponding to different modulation techniques, and the holding section holds the loop gain setting for each of the transmission modes.

According to an even further embodiment of the present invention, there is provided a receiving system including: a transmission channel decoding process section configured to perform processing including a synchronized detection process on a signal acquired via a transmission channel; and an information source decoding process section configured to decode the signal having undergone the processing performed by the transmission channel decoding process section, into data targeted for transmission. The transmission channel decoding process section includes: a first PLL circuit configured to output, based on an input reception signal, a first phase control signal representing a phase control amount of the reception signal; a second PLL circuit configured to input the same signal as the reception signal input to the first PLL circuit so as to output a second phase control signal representing the phase control amount of the reception signal; a first output circuit configured to control the phase of the reception signal based on the first phase control signal so as to output the phase-controlled signal; a second output circuit configured to control the phase of the reception signal based on the second phase control signal so as to output the phase-controlled signal; a first detection circuit configured to detect a phase control error in the first PLL circuit based on the phase-controlled signal output from the first output circuit; a second detection circuit configured to detect a phase control error in the second PLL circuit based on the phase-controlled signal output from the second output circuit; a control circuit configured such that if the phase control error detected in the first PLL circuit by the first detection circuit is larger than the phase control error detected in the second PLL circuit by the second detection circuit, then the control circuit establishes the same value as the loop gain of a second loop filter included in the second PLL circuit as the loop gain of a first loop filter included in the first PLL circuit; and a holding section configured to hold a loop gain setting established as the loop gain of the first loop filter included in the first PLL circuit. The reception signal is structured in units of a frame made up of a plurality of slots transmitted in a plurality of transmission modes corresponding to different modulation techniques, and the holding section holds the loop gain setting for each of the transmission modes.

According to a still further embodiment of the present disclosure, there is provided a receiving system including: a transmission channel decoding process section configured to perform processing including a synchronized detection process on a signal acquired via a transmission channel; and an output section configured to output an image and/or a sound based on the signal having undergone the processing performed by the transmission channel decoding process section. The transmission channel decoding process section includes: a first PLL circuit configured to output, based on an input reception signal, a first phase control signal representing a phase control amount of the reception signal; a second PLL circuit configured to input the same signal as the reception signal input to the first PLL circuit so as to output a second phase control signal representing the phase control amount of the reception signal; a first output circuit configured to control the phase of the reception signal based on the first phase control signal so as to output the phase-controlled signal; a second output circuit configured to control the phase of the reception signal based on the second phase control signal so as to output the phase-controlled signal; a first detection circuit configured to detect a phase control error in the first PLL circuit based on the phase-controlled signal output from the first output circuit; a second detection circuit configured to detect a phase control error in the second PLL circuit based on the phase-controlled signal output from the second output circuit; a control circuit configured such that if the phase control error detected in the first PLL circuit by the first detection circuit is larger than the phase control error detected in the second PLL circuit by the second detection circuit, then the control circuit establishes the same value as the loop gain of a second loop filter included in the second PLL circuit as the loop gain of a first loop filter included in the first PLL circuit; and a holding section configured to hold a loop gain setting established as the loop gain of the first loop filter included in the first PLL circuit. The reception signal is structured in units of a frame made up of a plurality of slots transmitted in a plurality of transmission modes corresponding to different modulation techniques, and the holding section holds the loop gain setting for each of the transmission modes.

According to a yet further embodiment of the present disclosure, there is provided a receiving system including: a transmission channel decoding process section configured to perform processing including a synchronized detection process on a signal acquired via a transmission channel; and a recording section configured to record the signal having undergone the processing performed by the transmission channel decoding process section. The transmission channel decoding process section includes: a first PLL circuit configured to output, based on an input reception signal, a first phase control signal representing a phase control amount of the reception signal; a second PLL circuit configured to input the same signal as the reception signal input to the first PLL circuit so as to output a second phase control signal representing the phase control amount of the reception signal; a first output circuit configured to control the phase of the reception signal based on the first phase control signal so as to output the phase-controlled signal; a second output circuit configured to control the phase of the reception signal based on the second phase control signal so as to output the phase-controlled signal; a first detection circuit configured to detect a phase control error in the first PLL circuit based on the phase-controlled signal output from the first output circuit; a second detection circuit configured to detect a phase control error in the second PLL circuit based on the phase-controlled signal output from the second output circuit; a control circuit configured such that if the phase control error detected in the first PLL circuit by the first detection circuit is larger than the phase control error detected in the second PLL circuit by the second detection circuit, then the control circuit establishes the same value as the loop gain of a second loop filter included in the second PLL circuit as the loop gain of a first loop filter included in the first PLL circuit; and a holding section configured to hold a loop gain setting established as the loop gain of the first loop filter included in the first PLL circuit. The reception signal is structured in units of a frame made up of a plurality of slots transmitted in a plurality of transmission modes corresponding to different modulation techniques, and the holding section holds the loop gain setting for each of the transmission modes.

Where the present disclosure is typically implemented as outlined above, the first PLL circuit is caused to output, based on an input reception signal, the first phase control signal representing the phase control amount of the reception signal; the second PLL circuit is caused to input the same signal as the reception signal input to the first PLL circuit so as to output the second phase control signal representing the phase control amount of the reception signal; the first output circuit is caused to control the phase of the reception signal based on the first phase control signal so as to output the phase-controlled signal; the second output circuit is caused to control the phase of the reception signal based on the second phase control signal so as to output the phase-controlled signal; the first detection circuit is caused to detect the phase control error in the first PLL circuit based on the phase-controlled signal output from the first output circuit; the second detection circuit is caused to detect the phase control error in the second PLL circuit based on the phase-controlled signal output from the second output circuit; if the phase control error detected in the first PLL circuit by the first detection circuit is larger than the phase control error detected in the second PLL circuit by the second detection circuit, then the same value as the loop gain of the second loop filter included in the second PLL circuit is established as the loop gain of the first loop filter included in the first PLL circuit; and the loop gain setting established as the loop gain of the first loop filter included in the first PLL circuit is held. The reception signal is structured in units of a frame made up of a plurality of slots transmitted in a plurality of transmission modes corresponding to different modulation techniques; and the loop gain setting is held for each of the transmission modes.

Thus according to the present disclosure, it is possible to search for optimum loop gains in keeping with the individual differences between receivers and the time jitter over transmission channels even where a plurality of modulation techniques are used in a transmission frame.

BRIEF DESCRIPTION OF THE DRAWINGS

FIG. 9 is block diagram showing a typical configuration of a third embodiment of the receiving system to which the frequency/phase synchronizing circuit of the embodiments of the present disclosure is applied; and FIG. 10 is a block diagram showing a typical structure of a personal computer.

DETAILED DESCRIPTION OF THE PREFERRED EMBODIMENTS

Some preferred embodiments of the present disclosure will now be described in reference to the accompanying drawings.

Explained first is the frame structure of the Advanced Satellite Digital Broadcasting System proposed as a next-generation satellite digital broadcasting system in Japan.

Figure 3:
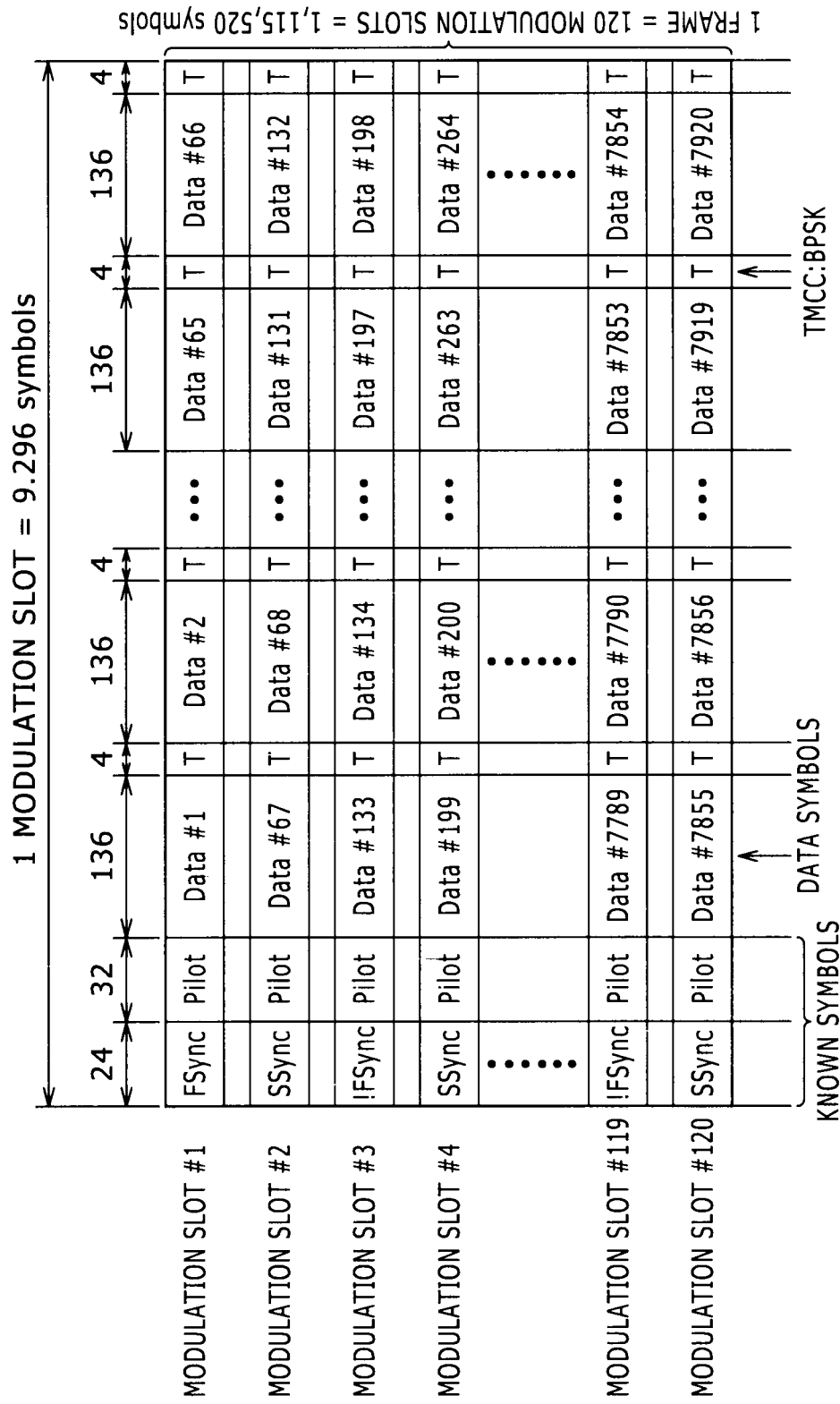
FIG. 3 is a schematic view explanatory of the frame structure of the Advanced Satellite Digital Broadcasting System.

FIG. 3 is a schematic view explanatory of the frame structure of the Advanced Satellite Digital Broadcasting System. As illustrated, one frame is composed of 120 modulation slots. In this example, the modulation slots are numbered from #1 to #120.

Each modulation slot includes 24 symbols for synchronization purposes (indicated as "Fsync," "!Fsync" and "Ssync" in FIG. 3) and 32 known symbols (each indicated as "Pilot" in FIG. 3) used for determining signal constellation points.

Also, each modulation slot includes 66 transmitted data items each composed of 136 symbols. For example, the transmitted data items in modulation slot #1 are indicated as "Data #1" through "Data #66," and the transmitted data items in modulation slot #2 are shown as "Data #67" through "Data #132."

Furthermore, in each modulation slot, a TMCC signal is inserted between every two transmitted data items, the signal being made up of four symbols constituting control information about transmission and multiplexing. In FIG. 3, reference character T denotes the TMCC signal.

Each frame of the Advanced Satellite Digital Broadcasting System structured as explained above is made up of a total of 1,115,520 symbols.

The Advanced Satellite Digital Broadcasting System makes it possible for a plurality of modulation techniques to coexist in each frame. For example, up to eight transmission modes may be defined in a single frame, each transmission mode allowing a different modulation technique to be adopted. With the Advanced Satellite Digital Broadcasting System, it is possible to use five modulation techniques consisting of BPSK, QPSK, 8PSK, 16APSK, and 32APSK.

Figure 4:
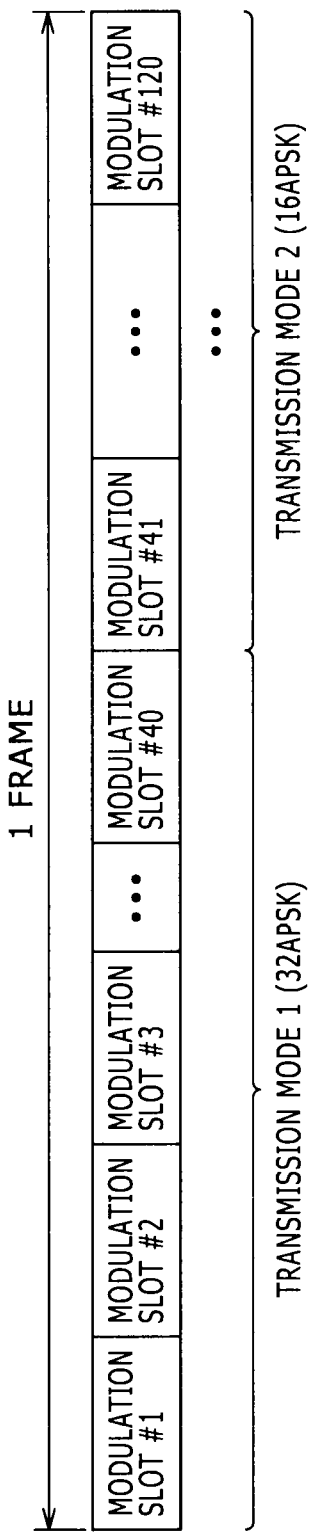
FIG. 4 is a schematic view showing typical transmission modes in a single frame of the Advanced Satellite Digital Broadcasting System.

FIG. 4 is a schematic view showing typical transmission modes in a single frame of the Advanced Satellite Digital Broadcasting System. For purpose of simplification, only two transmission modes are defined. As shown in FIG. 4, transmission mode 1 set for the transmission technique of 32APSK is assigned to modulation slots #1 through #40, and transmission mode 2 for the transmission technique of 16APSK is assigned to modulation slots #41 through #120.

The transmission mode of each modulation slot can be identified by analyzing the TMCC signal found two frames earlier than the current frame. The receiver is thus arranged to acquire and retain all TMCC signals inserted in each modulation slot of the frame received two frames earlier. This arrangement allows the receiver to identify the modulation technique for each modulation slot in each frame received.

Regardless of the transmission mode of each modulation slot, it should be noted, the TMCC signal is typically subjected to π/2 shift BPSK modulation.

The present disclosure aims to search for optimum loop gains even where a plurality of modulation techniques are used in each transmission frame, as shown in FIG. 4 for example.

Figure 5:
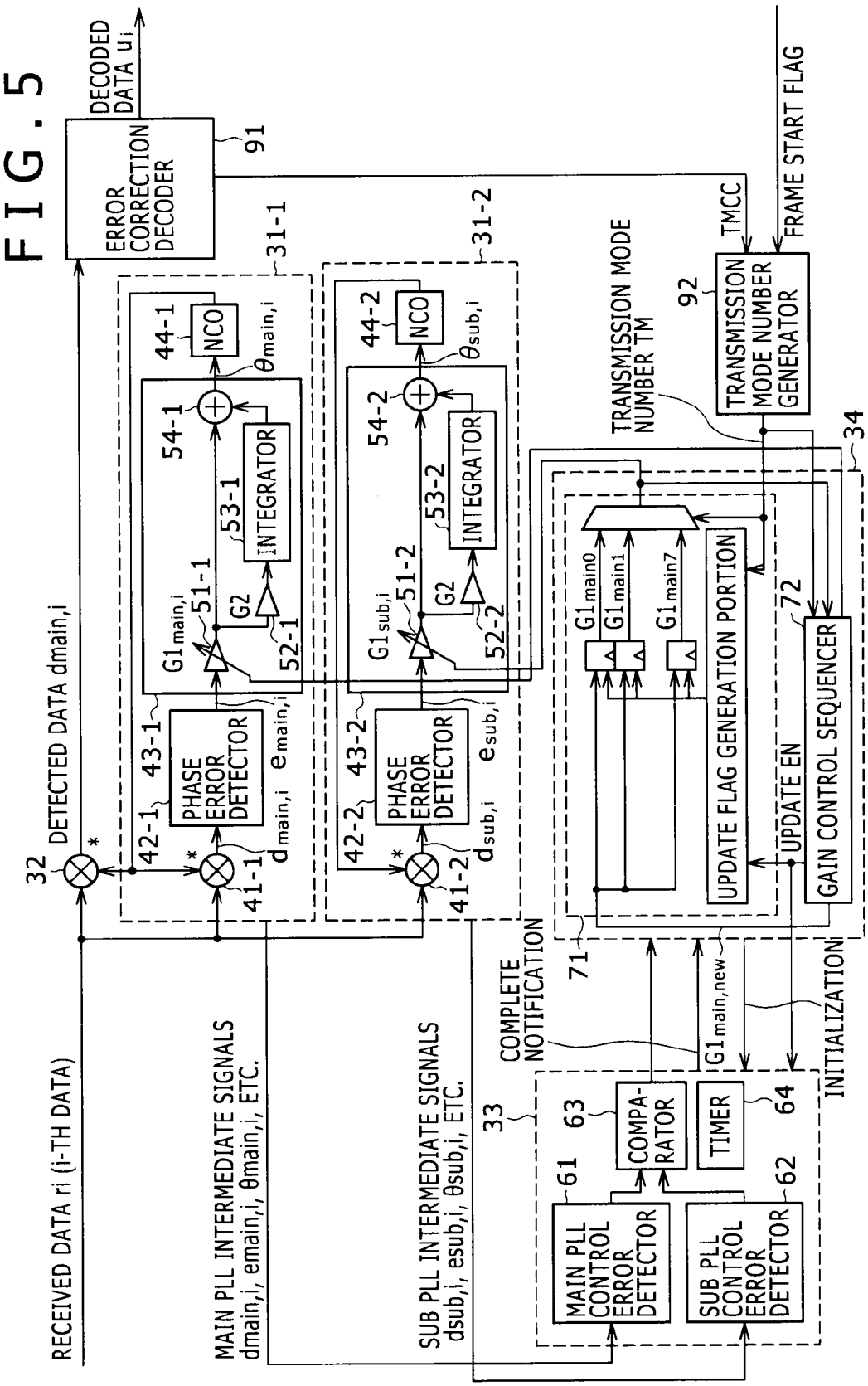
FIG. 5 is a block diagram showing a typical structure of a frequency/phase synchronizing circuit practiced as one embodiment of the present disclosure.

FIG. 5 is a block diagram showing a typical structure of a frequency/phase synchronizing circuit practiced as one embodiment of the present disclosure.

Figure 1:
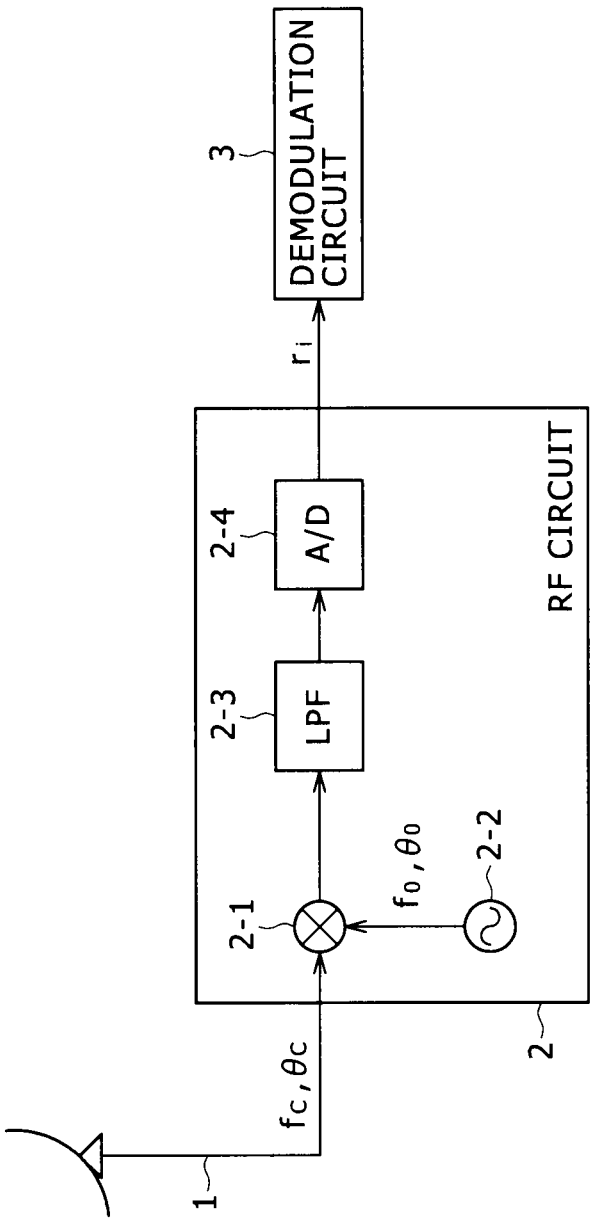
FIG. 1 is a schematic view showing a partial structure of an ordinary receiver that includes a frequency/phase synchronizing circuit utilizing a digital PLL.

The frequency/phase synchronizing circuit shown in FIG. 5 is incorporated in the demodulation circuit 3 of a receiver having the same structure as that indicated in FIG. 1.

The structure of the frequency/phase synchronizing circuit shown in FIG. 5 is largely different from the ordinary circuit structure in the following: that a main PLL circuit is supplemented with a sub PLL circuit having the same structure, that the loop gains of the loop filters in the main and sub PLL circuits are variable, and that a loop gain control setup is additionally provided.

The main PLL circuit 31-1 and the sub PLL circuit 31-2 are structured in such a manner as to use members that have the same characteristics and to possess the same circuit structure. If the same value is set as the loop gain of the loop filter in each of the main and sub PLL circuits 31-1 and 31-2 and if the same signal is input to the two circuits, then the signal output from the main PLL circuit 31-1 coincides with the signal output from the sub PLL circuit 31-2.

As will be explained later, the main PLL circuit 31-1 is a circuit that actually performs synchronized detection. The sub PLL circuit 31-2 may be considered a circuit that performs "trials" to determine the loop gain defining the characteristics of the loop filter in the main PLL circuit 31-1.

The reception signal ri, which is the i-th signal (at the i-th symbol), is input to a multiplier 41-1 of the main PLL circuit 31-1, to a multiplier 41-2 of the sub PLL circuit 31-2, and to a multiplier 32. The reception signal ri includes the phase error represented by $2\pi\Delta ft+\theta$ as mentioned above.

The multiplier 41-1 of the main PLL circuit 31-1 multiplies the reception signal ri by a phase control amount $e^{-j(2\pi\Delta ft+\theta)}$ supplied from a numerically controlled oscillator 44-1. A signal $d_{main,i}$ obtained through multiplication is output to a phase error detector 42-1. The signal output from the multiplier 41-1 is the same as a synchronized detection signal $d_{main,i}$ that is a phase control signal output from the multiplier 32.

Figure 2:
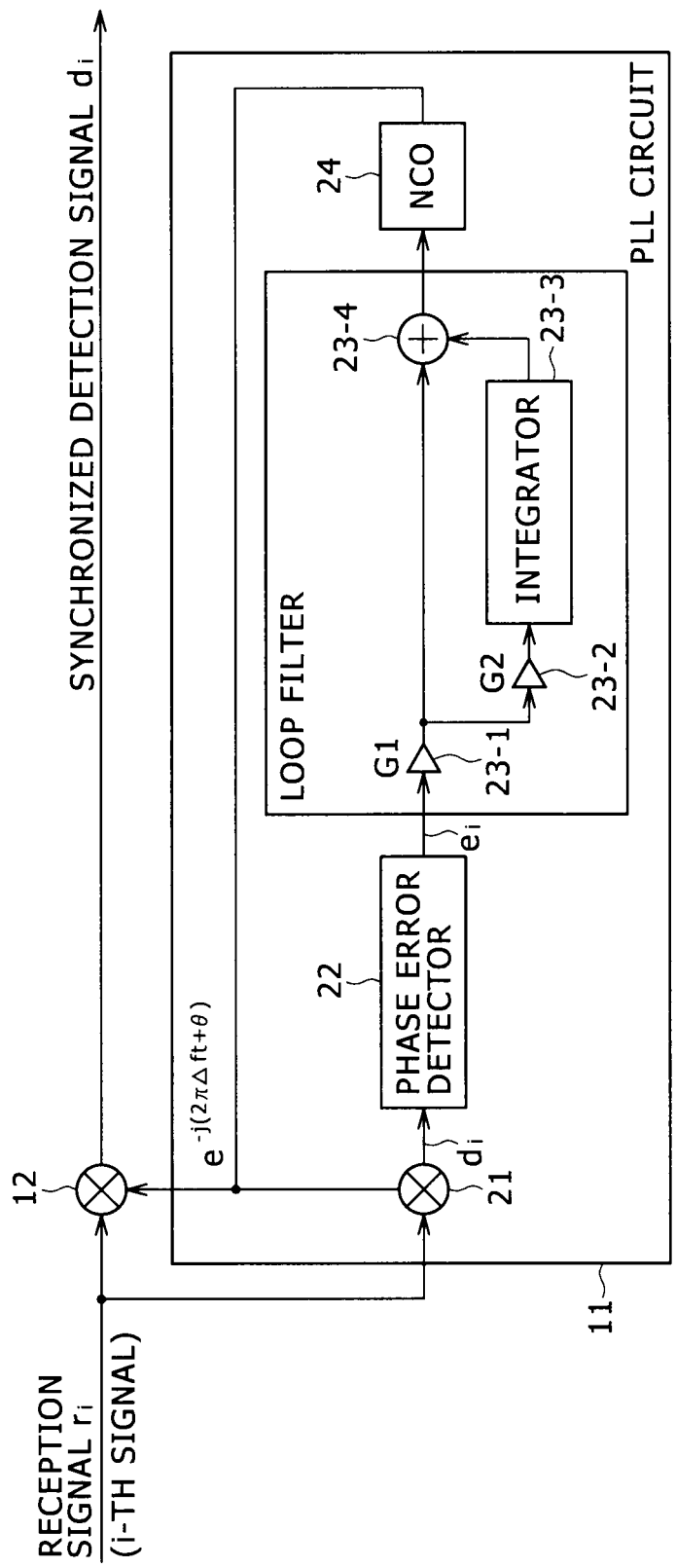
FIG. 2 is a schematic view showing a typical structure of a frequency/phase synchronizing circuit that uses a digital PLL and that is furnished in the setup of FIG. 1.

The phase error detector 42-1 detects a phase error that may remain in the signal output from the multiplier 41-1, and outputs a main phase error detection value $e_{main,i}$. The phase error detector 42-1 performs phase error detection in the same manner as the phase error detector 22 shown in FIG. 2. The same holds for a phase error detector 42-2 of the sub PLL circuit 31-2, to be discussed later.

The main phase error detection value $e_{main,i}$ output from the phase error detector 42-1 is fed to a multiplier 51-1 of a loop filter 43-1.

The loop filter 43-1 is a proportional integral loop filter that filters the main phase error detection value $e_{main,i}$ output from the phase error detector 42-1. The filtered value is output to the numerically controlled oscillator 44-1.

More specifically, the multiplier 51-1 of the loop filter 43-1 multiplies the main phase error detection value $e_{main,i}$ by $G1_{main}$ in accordance with a loop gain $G1_{main}$ established by a loop gain control portion 34. The value obtained through multiplication is output to a multiplier 52-1 and an adder 54-1.

The multiplier 52-1 further multiplies by G2 the G1$_{main}$-fold main phase error detection value e$_{main,i}$ fed from the multiplier 51-1. The value obtained through multiplication is output to an integrator 53-1.

The integrator 53-1 integrates the output from the multiplier 52-1 and outputs the result of the integration to the adder 54-1.

The adder 54-1 adds the output from the multiplier 51-1 and the output from the integrator 53-1, and outputs the sum of the addition as a filtering result θ$_{main,i}$ to the numerically controlled oscillator 44-1.

The numerically controlled oscillator 44-1 generates the phase control amount e$^{-j(2\pi\Delta ft+\theta)}$ based on the filtering result from the loop filter 43-1, and outputs the generated control amount to the multipliers 41-1 and 32.

The multiplier 32 multiplies the reception signal ri by the phase control amount e$^{-j(2\pi\Delta ft+\theta)}$ supplied from the numerically controlled oscillator 44-1 of the main PLL circuit 31-1. The signal obtained through multiplication is output as the synchronized detection signal d$_{main,i}$.

Meanwhile, a signal containing the signal d$_{main,i}$, main phase error detection value e$_{main,i}$, and filtering result θ$_{main,i}$ is supplied from the main PLL circuit 31-1 as a main PLL intermediate signal to a main PLL control error detector 61 of a PLL control error comparison portion 33.

The sub PLL circuit 31-2 also performs the same processing on the same reception signal ri as that input to the main PLL circuit 31-1.

That is, the multiplier 41-2 of the sub PLL circuit 31-2 multiplies the reception signal ri by the phase control amount e$^{-j(2\pi\Delta ft+\theta)}$ supplied from a numerically controlled oscillator 44-2. A signal d$_{sub,i}$ obtained through multiplication is output to a phase error detector 42-2.

The phase error detector 42-2 detects a phase error that may remain in the signal output from the multiplier 41-2, and outputs a sub phase error detection value e$_{sub,i}$ accordingly. The sub phase error detection value e$_{sub,i}$ output from the phase error detector 42-2 is fed to a multiplier 51-2 of a loop filter 43-2.

The multiplier 51-2 of the loop filter 43-2 multiplies the sub phase error detection value e$_{sub,i}$ by G1$_{sub}$ in accordance with a loop gain G1$_{sub}$ established by the loop gain control portion 34. The value obtained through multiplication is output to a multiplier 52-2 and an adder 54-2.

For example, the loop gain G1$_{sub}$ set for the multiplier 51-2 is made different from the loop gain G1$_{main}$ set for the multiplier 51-1 of the main PLL circuit 31-1.

The multiplier 52-2 further multiplies by G2 the G1$_{sub}$-fold sub phase error detection value e$_{sub,i}$ fed from the multiplier 51-2. The value obtained through multiplication is output to an integrator 53-2. The multiplier 52-1 of the main PLL 31-1 and the multiplier 52-2 of the sub PLL circuit 31-2 thus perform weighting by use of the same loop gain. The loop gain G2 is a predetermined fixed value.

The integrator 53-2 integrates the output from the multiplier 52-2 and outputs the result of the integration to the adder 54-2.

The adder 54-2 adds the output from the multiplier 51-2 and the output from the integrator 53-2, and outputs the sum of the addition as a filtering result θ$_{sub,i}$ to the numerically controlled oscillator 44-2.

The numerically controlled oscillator 44-2 generates the phase control amount e$^{-j(2\pi\Delta ft+\theta)}$ based on the filtering result from the loop filter 43-2, and outputs the generated control amount to the multiplier 41-2.

Meanwhile, a signal containing the signal d$_{main,i}$, sub phase error detection value e$_{sub,i}$, and filtering result θ$_{sub,i}$ is supplied from the sub PLL circuit 31-2 as a sub PLL intermediate signal to a sub PLL control error detector 62 of the PLL control error comparison portion 33.

The main PLL control error detector 61 of the PLL control error comparison portion 33 receives the main PLL intermediate signal fed from the main PLL circuit 31-1 every time the reception signal ri is input. For example, the main PLL control error detector 61 calculates a variance value of the main phase error detection value e$_{main,i}$ obtained out of the reception signal ri having a predetermined number of symbols. The variance value thus acquired is output to a comparator 63 as a control error value v$_{main}$.

The control error value v$_{main}$ is calculated based on the result of the multiplication performed by the multiplier 41-1, i.e., on the main phase error detection value e$_{main,i}$ representing the detected phase error remaining in the signal having undergone the phase control by the main PLL circuit 31-1. For that reason, the control error value v$_{main}$ denotes the error of the phase control carried out by the main PLL circuit 31-1.

The sub PLL control error detector 62 receives the sub PLL intermediate signal fed from the sub PLL circuit 31-2 every time the reception signal ri is input. For example, the sub PLL control error detector 62 calculates a variance value of the sub phase error detection value e$_{sub,i}$ obtained out of the reception signal ri having a predetermined number of symbols. The variance value thus acquired is output to the comparator 63 as a control error value v$_{sub}$.

The control error value v$_{sub}$ is calculated based on the result of the multiplication performed by the multiplier 41-2, i.e., on the sub phase error detection value e$_{sub,i}$ representing the detected phase error remaining in the signal having undergone the phase control by the sub PLL circuit 31-2. For that reason, the control error value v$_{sub}$ denotes the error of the phase control carried out by the sub PLL circuit 31-2.

The comparator 63 compares in magnitude the control error value v$_{main}$ supplied from the main PLL control error detector 61 with the control error value v$_{sub}$ fed from the sub PLL control error detector 62. The result of the comparison is output to the loop gain control portion 34 in response to a comparison result output notification supplied from a timer 64.

As described, the loop filter 43-1 of the main PLL circuit 31-1 and the loop filter 43-2 of the sub PLL circuit 31-2 use the different loop gains G1$_{main}$ and G1$_{sub}$. It follows that a difference reflecting the discrepancy between the loop gains G1$_{main}$ and G1$_{sub}$ appears in the control error value v$_{main}$ calculated by the main PLL control error detector 61 and in the control error value v$_{sub}$ computed by the sub PLL control error detector 62.

The foregoing paragraphs discussed an example in which the control error values v$_{main}$ and v$_{sub}$ are calculated based on the main and sub phase error detection values e$_{main,i}$ and e$_{sub,i}$. Alternatively, the control error values v$_{main}$ and v$_{sub}$ may be computed based on the signal d$_{main,i}$; on the filtering result θ$_{main,i}$ and signal d$_{sub,i}$; or on the filtering result θ$_{sub,i}$.

The timer 64 starts counting time upon receipt of an initialization flag fed from the loop gain control portion 34. Upon elapse of a predetermined count time, the timer 64 outputs a comparison complete notification to the loop gain control portion 34. The time it takes to calculate the control error value is preset on the timer 64, and the preset time is counted by the timer 64. The timer 64 also outputs a comparison result output notification to the comparator 63 simultaneously with outputting the comparison complete notification to the loop gain control portion 34.

The loop gain control portion 34 has a gain control sequencer 72 furnished inside. The loop gain control portion 34 searches for optimum loop gains while monitoring the operation status of the main and sub PLL circuits 31-1 and 31-2, and establishes the detected optimum loop gains for their respective loop filters.

For example, if the control error value $v_{main}$ calculated by the main PLL control error detector 61 is larger than the control error value $v_{sub}$ computed by the sub PLL control error detector 62, the loop gain control portion 34 sets the same value as the loop gain $G1_{sub}$ to the loop filter 43-1 of the main PLL circuit 31-1, replacing the previously established loop gain $G1_{main}$.

That the control error value $v_{main}$ is larger than the control error value $v_{sub}$ signifies that synchronous acquisition can be performed with less error by establishing the loop gain $G1_{sub}$ set to the loop filter 43-2 of the sub PLL circuit 31-2. Thus in this case, the loop gain $G1_{main}$ for the loop filter 43-1 of the main PLL circuit 31-1 is replaced by the loop gain $G1_{sub}$.

If the control error value $v_{sub}$ calculated by the sub PLL control error detector 62 is larger than the control error value $v_{main}$ computed by the main PLL control error detector 61, the gain control sequencer 72 of the loop gain control portion 34 leaves the loop gain $G1_{main}$ unchanged for the loop filter 43-1 of the main PLL circuit 31-1.

That the control error value $v_{sub}$ is larger than the control error value $v_{main}$ as described above signifies that using the loop gain $G1_{main}$ unchanged allows synchronous acquisition to be performed with less error than if the loop gain $G1_{sub}$ is utilized. Thus in this case, the loop gain $G1_{main}$ for the loop filter 43-1 of the main PLL circuit 31-1 will not be replaced by the loop gain $G1_{sub}$.

As described, after it has been determined whether or not to replace the loop gain $G1_{main}$, the loop gain $G1_{sub}$ for the loop filter 43-2 is changed. Then another comparison is made in magnitude between the control error value $v_{sub}$ and the control error value $v_{main}$ so as to determine whether or not to replace the loop gain $G1_{main}$. In this manner, searches continue for the optimum loop gains.

When the loop gain $G1_{sub}$ is to be changed, the gain control sequencer 72 establishes the loop gain $G1_{sub}$ using the formula of $G1_{sub}=G1_{sub}+\alpha$, where $\alpha$ stands for the smallest step of the established G1 being quantized. In this case, if the established $G1_{sub}$ exceeds a maximum tolerable value $G1_{max}$, the loop gain control portion 34 outputs a search complete signal.

The loop gain control portion 34 causes an internally furnished transmission mode-specific gain selection portion 71 to hold the loop gain $G1_{main}$ for each of the transmission modes involved for selective loop gain output. For this reason, the transmission mode-specific gain selection portion 71 possesses as many registers as the maximum number N of the transmission modes involved (e.g., N=8), each register being used to hold an optimum loop gain for the transmission mode in question. It is assumed that these registers give output values G1main0, G1main1, ... G1mainN-1.

The transmission mode of the reception signal ri, the modulation technique adopted for each transmission mode, and the modulation slots assigned to the transmission mode in question are identified by the TMCC fed from an error correction decoder 91.

A transmission mode number generator 92 counts the received symbols starting from an input frame start flag and, based on the received symbol count value, identifies which modulation slot the currently received symbol belongs to. Also, based on information acquired from the TMCC signal and representing the modulation slots assigned to each transmission mode, the transmission mode number generator 92 determines the number TM identifying the transmission mode of the currently received symbol (TM is called the transmission mode number) and outputs the transmission mode number TM to the loop gain control portion 34.

For example, if the currently received transmission scheme has as many as "n" transmission modes multiplexed therein, then the transmission mode numbers TM are 0, 1, ... n−1.

The gain control sequencer 72 holds a transmission mode number TMtarget about which a search for an optimum loop gain is to be made. Only during reception of the symbols for which TM=TMtarget, does the gain control sequencer 72 allow the PLL control error comparator 33 and transmission mode-specific gain selection portion 71 to operate. The gain control sequencer 72 outputs an update EN (enable) signal that goes High during reception of the symbols for which TM=TMtarget, to the PLL control error comparison portion 33 and transmission mode-specific gain selection portion 71.

While the update EN signal is being High, the PLL control error comparison portion 33 carries out the processes discussed above. Where the loop gain $G1_{main}$ is to be replaced by the loop gain $G1_{sub}$ while the update EN signal is being High, an update flag generation portion inside the transmission mode-specific gain selection portion 71 outputs a flag for writing to a loop gain register corresponding to the transmission mode number TM currently in effect.

When the frequency/phase synchronizing circuit shown in FIG. 5 is started, the transmission mode number about which a search for the optimum loop gain is to be made is initialized (TMtarget=0). Then the loop gains for the main and sub PLL circuits 31-1 and 31-2 are initialized.

After the loop gains for the main and sub PLL circuits 31-1 and 31-2 have been initialized, the loop gain control portion 34 outputs an initialization flag to the PLL control error comparison portion 33.

Upon receipt of the initialization flag from the loop gain control portion 34, the PLL control error comparison portion 33 resets the currently effective result of the control error value comparison as well as the timer 64. Thereafter, the PLL control error comparison portion 33 calculates the control error value $v_{main,i}$ and $v_{sub,i}$ as discussed above. The comparator 63 starts comparing these control error values in magnitude.

Upon being reset, the timer 64 of the PLL control error comparison portion 33 starts counting time. When the count time necessary for calculating the control error value is reached, the timer 64 outputs a comparison complete notification to the loop gain control portion 34. At the same time, the timer 64 outputs a comparison result output command to the comparator 63. This in turn causes the comparator 63 to output the result of the control error comparison to the loop gain control portion 34.

Given the control error comparison result, the loop gain control portion 34 controls accordingly the loop gains to be supplied to the loop filters 43-1 and 43-2. At this point, if the loop gain $G1_{main}$ is to be replaced by the loop gain $G1_{sub}$, the gain control sequencer 72 feeds the loop gain $G1_{sub}$ to the transmission mode-specific gain selection portion 71 as discussed above.

The transmission mode-specific gain selection portion 71 updates the value held in a loop gain register G1main[TM], one of a plurality of internal registers which corresponds to the transmission mode number TM, by use of the value input from the gain control sequencer 72.

Also, the transmission mode-specific gain selection portion 71 selects from G1main0, G1main1, ... G1mainN−1 the loop gain corresponding to the transmission mode number TM fed from the transmission mode number generator 92, and outputs the selected loop gain as the loop gain for the loop filter 43-1.

If a search complete signal is output from the gain control sequencer 72 before a comparison complete notification is received from the PLL control error comparison portion 33, then a check is made to see if the TMtarget value equals n−1 so as to determine whether the search for the optimum gains for all transmission modes has been completed. If the TMtarget value is not equal to n−1, then the TMtarget value is incremented by 1 in order to make a search for the optimum gain for the next transmission mode. At the same time, the loop gains for the main and sub PLL circuits 31-1 and 31-2 are again initialized.

In the manner described above, the search is made for the optimum loop gain regarding each of the TMtarget values 0 through n−1. This makes it possible to establish the optimum loop gain for each of the transmission modes involved based on different modulation techniques.

Alternatively, if a search complete signal is output from the gain control sequencer 72 before a comparison complete notification is received from the PLL control error comparison portion 33 and if the TMtarget value is equal to n−1, then the TMtarget value may be reset to 0. That is, after the search has been made for the optimum loop gain regarding each of the TMtarget values 0 through n−1, another search may again be started for an optimum loop gain regarding each of the TMtarget values 0 through n−1.

In this manner, even where there exists time jitter in the transmission characteristics of the transmission channels involved, searches for optimum loop gains can be made continuously and the detected loop gains may be used uninterruptedly.

Figure 6:
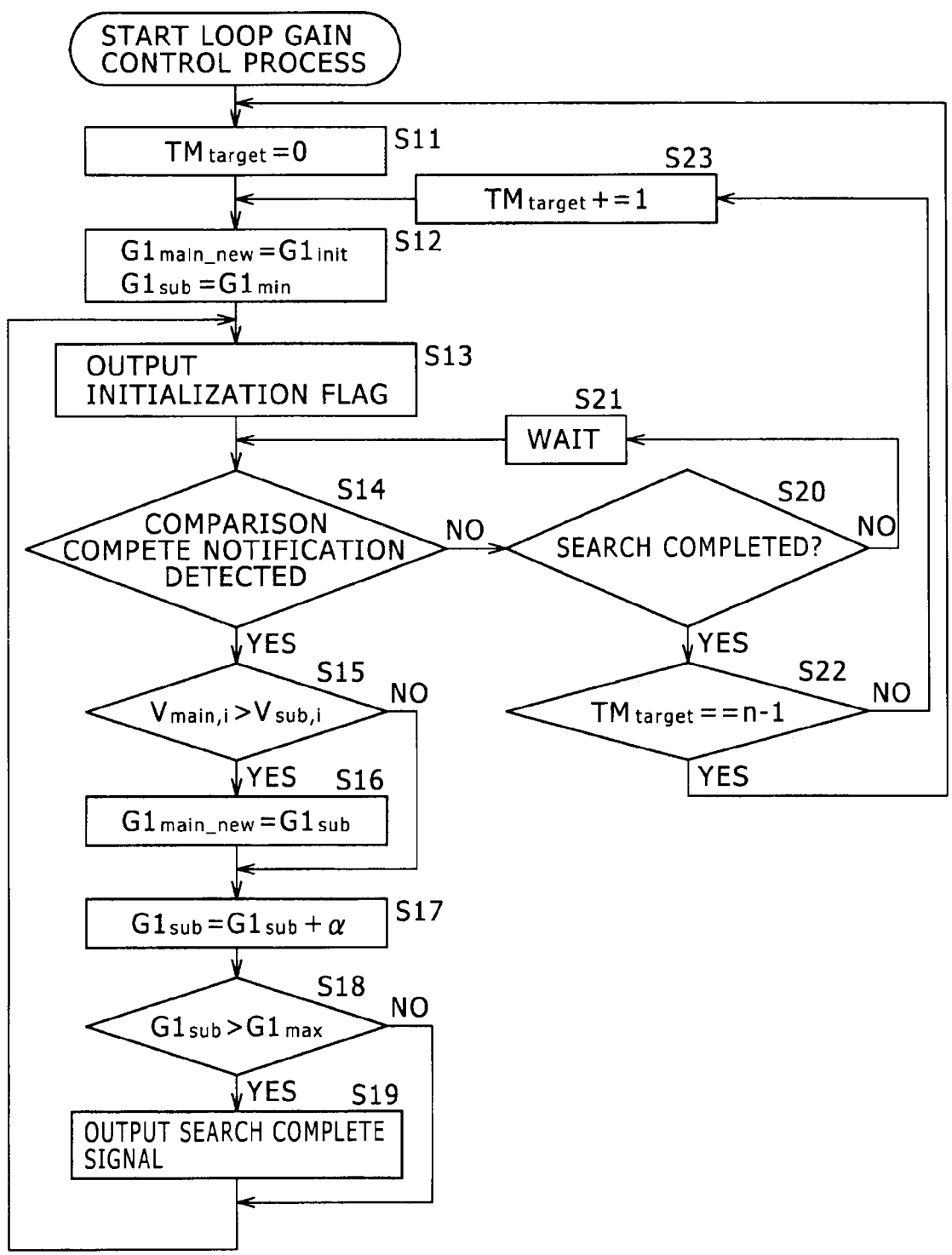
FIG. 6 is a flowchart explanatory of a typical loop gain control process.

Explained below in reference to the flowchart of FIG. 6 is a typical loop gain control process performed by the frequency/phase synchronizing circuit shown in FIG. 5.

In step S11, the gain control sequencer 72 initializes the variable TMtarget to 0.

In step S12, the gain control sequencer 72 initializes that loop gain register inside the transmission mode-specific gain selection portion 71 which corresponds to the variable TMtarget. In this example, the setting of the loop gain register in question is represented by $G1_{main\_new}$ and the initial value thereof by $G1_{init}$. The setting $G1_{main\_new}$ is used as the loop gain $G1_{main}$ for the loop filter 43-1.

Also in step S12, the gain control sequencer 72 initializes the loop gain $G1_{sub}$ for the loop filter 43-2. The initial value of the loop gain $G1_{sub}$ is the smallest loop gain that is $G1_{min}$. The setting $G1_{sub}$ is used as the loop gain $G1_{sub}$ for the loop filter 43-2.

Step S13 is reached following the loop gain initialization. In step S13, the loop gain control portion 34 outputs an initialization flag to the PLL control error comparison portion 33.

Upon receipt of the initialization flag, the PLL control error comparison portion 33 resets the result of the control error comparison carried out so far as well as the count value on the internal timer.

Also, the main PLL control error detector 61 of the PLL control error comparison portion 33 calculates the control error value $v_{main}$ based on the main PLL intermediate signal output from the main PLL circuit 31-1. The sub PLL control error detector 62 computes the control error value $v_{sub}$ based on the sub PLL intermediate signal output from the sub PLL circuit 31-2.

After being reset, the timer 64 starts counting time. Upon elapse of a predetermined count time necessary for calculating the control error values $v_{main}$ and $v_{sub}$, the timer 64 outputs a comparison complete notification to the loop gain control portion 34. At the same time, the timer 64 outputs a comparison result output command to the comparator 63. In response to the comparison result output command, the comparator 63 outputs the result of the comparison in magnitude between the control error values $v_{main}$ and $v_{sub}$ to the loop gain control portion 34.

In step S14, the gain control sequencer 72 determines whether the comparison complete notification output from the timer 64 is detected. If it is determined that the comparison complete notification is not detected yet, control is passed on to step S20.

In step S20, it is determined whether a search complete signal is output. If it is determined that the search complete signal is not output yet, control is passed on to step S21. In step S21, the comparison complete notification from the timer 64 is polled at intervals of a predetermined time period in a wait state. Thereafter, control is returned to step S14.

If it is determined in step S14 that the comparison complete notification is detected, control is passed on to step S15.

In step S15, the gain control sequencer 72 determines whether $v_{main}>v_{sub}$ based on the comparison result fed from the comparator 63.

If it is determined in step S15 that $v_{main}>v_{sub}$ then step S16 is reached. In step S16, the gain control sequencer 72 replaces the loop gain $G1_{main\_new}$ with $G1_{sub}$ currently established as the loop gain for the loop filter 43-2. At this point, the gain control sequencer 72 outputs a predetermined signal to the update flag generation portion inside the transmission mode-specific gain selection portion 71. In turn, the update flag generation portion outputs a flag for writing to the loop gain register corresponding to the transmission mode number TM currently in effect.

If it is determined in step S15 that $v_{main} \leq v_{sub}$ instead of $v_{main}>v_{sub}$, then step S16 is skipped.

In step S17, the gain control sequencer 72 establishes $G1_{sub}+\alpha$ and updates the loop gain $G1_{sub}$ therewith, where $\alpha$ denotes the amount of gain corresponding to the smallest step of the loop gain G1 ($G1_{main}$ or $G1_{sub}$) being quantized.

In step S18, the gain control sequencer 72 determines whether the loop gain $G1_{sub}$ updated in step S17 exceeds the maximum tolerable value $G1_{max}$.

If it is determined in step S18 that the loop gain $G1_{sub}$ has exceeded the maximum value $G1_{max}$, control is passed on to step S19. In step S19, the gain control sequencer 72 outputs a search complete signal.

If it is determined in step S18 that the loop gain $G1_{sub}$ has not exceeded the maximum value $G1_{max}$, then step S19 is skipped.

Control is returned to step S13 if it is determined in step S18 that the loop gain $G1_{sub}$ has not exceeded the maximum value $G1_{max}$, or after step S19 has been completed.

After the search complete signal is output in step S19, the signal output is confirmed in step S20. Thereafter, control is returned to step S22.

In step S22, the gain control sequencer 72 determines whether the variable TMtarget is equal to n−1. If it is determined that the variable TMtarget is not equal to n−1, control is passed on to step S23. In step S23, the gain control sequencer 72 increments the variable TMtarget by 1. Control is then returned to step S12. That is, another search is made here for the optimum loop gain for the next transmission mode number.

If it is determined in step S22 that the variable TMtarget is equal to n−1, control is returned to step S11. That is, after the search has been made for the optimum loop gains for all transmission mode numbers, a second search is started for the optimum loop gain for each of the TMtarget values 0 through n−1. In the second and subsequent searches, there is no need to initialize $G1_{main\_new}$ in step S12.

Alternatively, if it is determined in step S22 that the variable TMtarget is equal to n−1, the loop gain control process may be terminated.

The loop gain control process is carried out in the manner described above. Thus according to the present disclosure, it is possible to search for optimum loop gains in keeping with the individual differences between receivers and the time jitter over transmission channels even where a plurality of modulation techniques are used in the transmission frame.

The foregoing paragraphs have explained examples in which the search is made for the optimum loop gain as the loop gain G1 for use in direct multiplications performed on the detected phase error in the frequency/phase synchronizing circuit. Alternatively, a search may be made for the loop gain G2 for use in the multiplication to be performed on the phase error resulting from the multiplication using the loop gain G1.

As another alternative, searches may be made for both the loop gain G1 and the loop gain G2.

Figure 7:
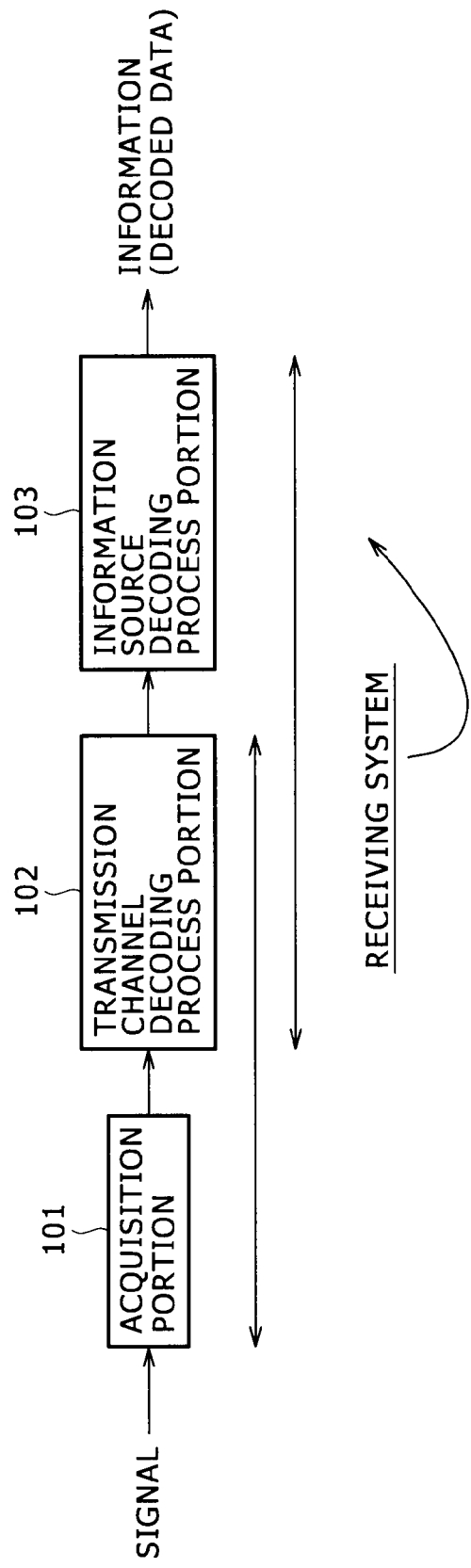
FIG. 7 is block diagram showing a typical configuration of a first embodiment of a receiving system to which the frequency/phase synchronizing circuit of the embodiments of the present disclosure is applied.

FIG. 7 is block diagram showing a typical configuration of a first embodiment of a receiving system to which the frequency/phase synchronizing circuit of the embodiments of the present disclosure is applied.

The receiving system of FIG. 7 is made up of an acquisition portion 101, a transmission channel decoding process portion 102, and an information source decoding process portion 103.

The acquisition portion 101 acquires a signal via transmission channels such as terrestrial digital broadcasts, satellite digital broadcasts, CATV networks and the Internet, not shown, and forwards the acquired signal to the transmission channel decoding process portion 102.

Given the signal acquired by the acquisition portion 101 via the transmission channels, the transmission channel decoding process portion 102 performs a transmission channel decoding process including synchronized detection and error correction on the received signal, and forwards the signal resulting from the decoding process to the information source decoding process portion 103. That is, the transmission channel decoding process 102 includes the structure of the frequency/phase synchronizing circuit shown in FIG. 5 that performs the above-mentioned synchronized detection.

The information source decoding process portion 103 performs an information source decoding process on the signal having undergone the transmission channel decoding process, the information source decoding process including the process of expanding the compressed information back to the original information whereby the transmitted data is acquired.

That is, the signal acquired by the acquisition portion 101 via the transmission channels may have undergone compression coding whereby the original information was compressed so as to reduce the amount of the data such as video and audio data. In such a case, the information source decoding process portion 103 performs the information source decoding process on the signal having undergone the transmission channel decoding process, the information source decoding process including the process of expanding the compressed information back to the original information.

If the signal acquired by the acquisition portion 101 via the transmission channels has not undergone compression coding, the information source decoding process portion 103 does not perform the process of expanding the compressed information back to the original information. The expanding process includes MPEG decoding, for example. The information source decoding process may include descrambling in addition to the expanding process.

The receiving system of FIG. 7 may be applied to TV tuners for receiving digital TV broadcasts, for example. The acquisition portion 101, transmission channel decoding processing portion 102, and information source decoding processing portion 103 may each be implemented in the form of an independent device (hardware (e.g., IC (integrated circuit)) or a software module).

Alternatively, the acquisition portion 101, transmission channel decoding processing portion 102, and information source decoding processing portion 103 may be implemented altogether as an independent device. As another alternative, the acquisition portion 101 and transmission channel decoding processing portion 102 may be implemented in combination as an independent device. As a further alternative, the transmission channel decoding processing portion 102 and information source decoding processing portion 103 may be implemented in combination as an independent device.

Figure 8:
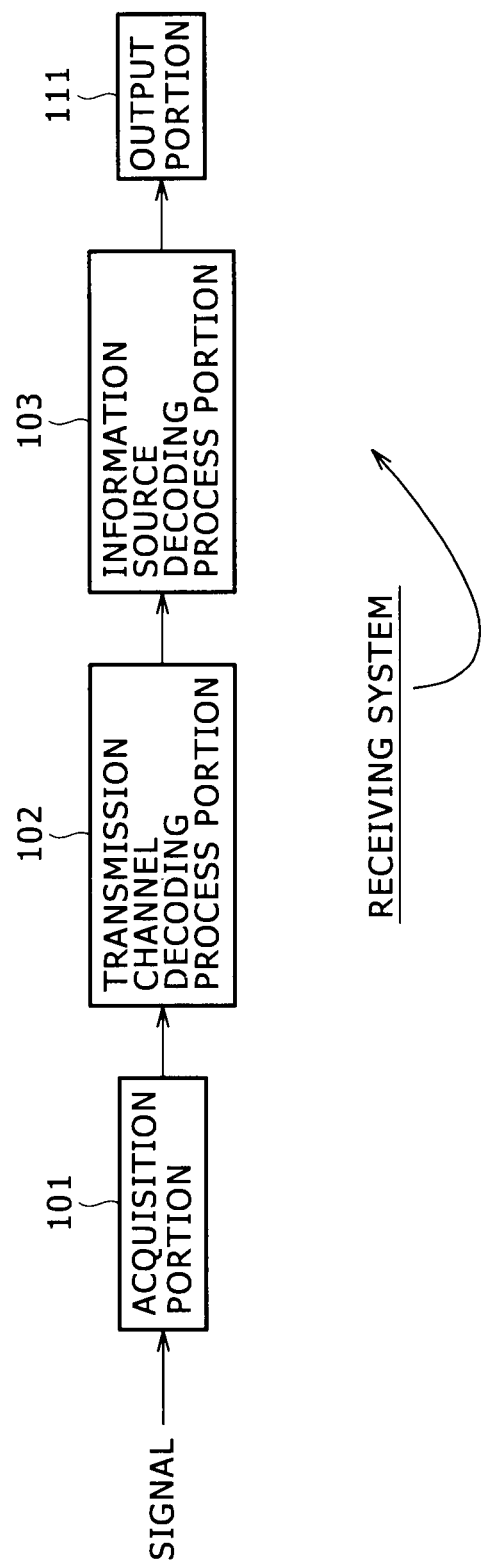
FIG. 8 is block diagram showing a typical configuration of a second embodiment of the receiving system to which the frequency/phase synchronizing circuit of the embodiments of the present disclosure is applied.

FIG. 8 is block diagram showing a typical configuration of a second embodiment of the receiving system to which the frequency/phase synchronizing circuit of the embodiments of the present disclosure is applied.

Of the components in FIG. 8, those with their corresponding counterparts shown in FIG. 7 are designated by like reference numerals, and their explanations may be omitted where appropriate.

The configuration of the receiving system in FIG. 8 is common to the configuration of its counterpart in FIG. 7 in that the acquisition portion 101, transmission channel decoding process portion 102, and information source decoding process portion 103 are provided. On the other hand, the configuration of FIG. 8 is different from that of FIG. 7 in that an output portion 111 is additionally provided.

The output portion 111 may be typically composed of a display device for displaying images and of speakers for outputting sounds. As such, the output portion 111 outputs images and sounds derived from the signal output from the information source decoding process portion 103. In short, the output portion 111 is a component that outputs images and/or sounds.

The receiving system of FIG. 8 may be applied to TV sets for receiving digital TV broadcasts and to radio receivers for receiving radio broadcasts, for example.

If the signal acquired by the acquisition portion 101 has not undergone compression coding, then the signal output from the transmission channel decoding process portion 102 is fed directly to the output portion 111.

FIG. 9 is block diagram showing a typical configuration of a third embodiment of the receiving system to which the frequency/phase synchronizing circuit of the embodiments of the present disclosure is applied.

Of the components in FIG. 9, those with their corresponding counterparts shown in FIG. 7 are designated by like reference numerals, and their explanations may be omitted where appropriate.

The configuration of the receiving system in FIG. 9 is common to the configuration of its counterpart in FIG. 7 in that the acquisition portion 101 and transmission channel decoding process portion 102 are provided. On the other hand, the configuration of FIG. 9 is different from that of FIG. 7 in that the information source decoding process portion 103 is not provided and a recording portion 121 is additionally furnished.

The recording portion 121 records (stores) the signal (e.g., TS packets in the MPEG format) output from the transmission channel decoding process portion 102 to recording (storage) media such as optical disks, hard disks (magnetic disks), and flash memories.

The above-described receiving system of FIG. 9 may be applied to recorders for recording TV broadcasts, for example.

As another example, the receiving system of FIG. 9 may be furnished with the information source decoding process portion 103. In this case, the recording portion 121 may record the signal having undergone the information source decoding process performed by the information source decoding process portion 103, i.e., images and sounds acquired through the decoding process.

The series of processes described above may be executed either by hardware or by software. Where the software-based processing is to be carried out, the programs constituting the software may be either incorporated beforehand in the dedicated hardware of the computer to be used, or installed upon use over a network or from a suitable recording medium into a general-purpose personal computer or like equipment such as a personal computer 700 shown in FIG. 10 capable of executing diverse functions based on the installed programs.

In FIG. 10, a CPU (central processing unit) 701 performs various processes in accordance with the programs stored in a ROM (read only memory) 702 or according to the programs loaded from a storage device 708 into a RAM (random access memory) 703. The RAM 703 may also accommodate data and other resources needed by the CPU 701 in carrying out diverse processing.

The CPU 701, ROM 702, and RAM 703 are interconnected via a bus 704. An input/output interface 705 is also connected to the bus 704.

The input/output interface 705 is connected with an input device 706, output device 707, storage device 708, and communication device 709. The input device 706 is generally composed of a keyboard and a mouse. The output device 70 is usually constituted by a display unit such as LCD (liquid crystal display) and speakers. The storage device 708 is typically formed by a hard disk. The communication device 709 is ordinarily structured with a modem and a network interface such as a LAN card. The communication device 709 conducts communications over networks including the Internet.

A drive 710 may be further connected as needed to the input/output interface 705. A piece of removable media 711 such as magnetic disks, optical disks, magneto-optical disks or semiconductor memories may be loaded into the drive 710. Computer programs may be retrieved from the loaded removable medium and installed as needed into the storage device 708.

Where the above-described series of processes is to be executed by software, the programs making up the software may be installed over networks including the Internet or from recording media such as the removable media 711.

As shown in FIG. 10, the recording media which are offered to users apart from their computers and which accommodate the programs may be constituted not only by the removable media 711 such as magnetic disks (including floppy disks (registered trademark)), optical disks (including CD-ROM (compact disk read-only memory) and DVD (digital versatile disk)), magneto-optical disks (including MD (Mini-disk; registered trademark)), or semiconductor memories; but also by such recording media as the ROM 702 or hard disks contained in the storage device 708. The latter recording media with the programs stored thereon are preinstalled in the computer when offered to the user.

In this specification, the series of the processes discussed above include not only the processes carried out in the depicted sequence (i.e., on a time series basis) but also processes that may be conducted parallelly or individually and not necessarily chronologically.

It should be understood by those skilled in the art that various modifications, combinations, sub-combinations and alterations may occur depending on design requirements and other factors in so far as they are within the scope of the appended claims or the equivalents thereof.

The present disclosure contains subject matter related to that disclosed in Japanese Priority Patent Application JP 2010-219644 filed in the Japan Patent Office on Sep. 29, 2010, the entire content of which is hereby incorporated by reference.

What is claimed is:

1. A synchronizing circuit comprising:
   a first phase-locked loop circuit configured to output, based on an input reception signal, a first phase control signal representing a phase control amount of said reception signal;
   a second phase-locked loop circuit configured to input the same signal as said reception signal input to said first phase-locked loop circuit so as to output a second phase control signal representing the phase control amount of said reception signal;
   a first output circuit configured to control the phase of said reception signal based on said first phase control signal so as to output the phase-controlled signal;
   a second output circuit configured to control the phase of said reception signal based on said second phase control signal so as to output the phase-controlled signal;
   a first detection circuit configured to detect a phase control error in said first phase-locked loop circuit based on the phase-controlled signal output from said first output circuit;
   a second detection circuit configured to detect a phase control error in said second phase-locked loop circuit based on the phase-controlled signal output from said second output circuit;
   a control circuit configured such that if the phase control error detected in said first phase-locked loop circuit by said first detection circuit is larger than the phase control error detected in said second phase-locked loop circuit by said second detection circuit, then said control circuit establishes the same value as the loop gain of a second loop filter included in said second phase-locked loop circuit as the loop gain of a first loop filter included in said first phase-locked loop circuit; and
   a holding section configured to hold a loop gain setting established as the loop gain of said first loop filter included in said first phase-locked loop circuit;
   wherein said reception signal is structured in units of a frame made up of a plurality of slots transmitted in a plurality of transmission modes corresponding to different modulation techniques, and
   said holding section holds said loop gain setting for each of said transmission modes.

2. The synchronizing circuit according to claim 1, further comprising:
   a comparison section configured to compare in magnitude the phase control error detected in said first phase-locked loop circuit by said first detection circuit with the phase control error detected in said second phase-locked loop circuit by said second detection circuit; and
   a loop gain search section configured such that every time the comparison is made by said comparison section during input of the reception signal corresponding to said slots of a designated transmission mode, said loop gain search section searches for an optimum loop gain setting for said transmission mode by changing by a predetermined amount the loop gain value of said second loop filter included in said second phase-locked loop circuit;

wherein, if the loop gain value of said second loop filter is changed a predetermined number of times by said loop gain search section, then said holding section holds the value established as the loop gain of said first loop filter as the optimum loop gain setting for said transmission mode.

3. The synchronizing circuit according to claim 2, further comprising a transmission mode number identification section configured to identify a transmission mode number constituting information for identifying the transmission mode of each of said slots in said reception signal, based on control information obtained by decoding said reception signal;

wherein, if the identified transmission mode number corresponds to said designated transmission mode, then said loop gain search section searches for said optimum loop gain setting, and said holding section holds said optimum loop gain setting in correspondence with the transmission mode number identified by said transmission mode number identification section.

4. The synchronizing circuit according to claim 1, wherein said first phase-locked loop circuit includes a first detection circuit configured to detect a phase error remaining in the phase-controlled signal, said first loop filter configured to perform a filtering process on the phase error detected by said first detection circuit, a first oscillation circuit configured to output said first phase control signal depending on the result of the filtering process performed by said first loop filter, and a first output circuit configured to control the phase of said reception signal based on said first phase control signal output from said first oscillation circuit, said first output circuit further outputting the phase-controlled signal to said first detection circuit as a signal targeted for phase error detection, and said second phase-locked loop circuit includes a second detection circuit configured to detect a phase error remaining in the phase-controlled signal, said second loop filter configured to perform a filtering process on the phase error detected by said second detection circuit, a second oscillation circuit configured to output said second phase control signal depending on the result of the filtering process performed by said second loop filter, and said second output circuit configured to control the phase of said reception signal based on said second phase control signal output from said second oscillation circuit, said second output circuit further outputting the phase-controlled signal to said second detection circuit as a signal targeted for phase error detection.

5. The synchronizing circuit according to claim 4, wherein said first loop filter includes a first multiplication circuit configured to multiply the phase error detected by said first detection circuit by a first loop gain, a second multiplication circuit configured to multiply the phase error multiplied by said first multiplication circuit by a second loop gain, and a first addition circuit configured to add the phase error multiplied by said first multiplication circuit and the result of integrating the phase error multiplied by said second multiplication circuit, said first addition circuit further outputting the sum of the addition to said first oscillation circuit, and said second loop filter includes a third multiplication circuit configured to multiply the phase error detected by said second detection circuit by third loop gain, a fourth multiplication circuit configured to multiply the phase error multiplied by said third multiplication circuit by a fourth loop gain, and a second addition circuit configured to add the phase error multiplied by said third multiplication circuit and the result of integrating the phase error multiplied by said fourth multiplication circuit, said second addition circuit further outputting the sum of the addition to said second oscillation circuit.

6. The synchronizing circuit according to claim 5, wherein said control circuit establishes a different value for each of said first loop gain and said third loop gain.

7. A synchronizing method comprising:

causing a first phase-locked loop circuit to output, based on an input reception signal, a first phase control signal representing a phase control amount of said reception signal;

causing a second phase-locked loop circuit to input the same signal as said reception signal input to said first phase-locked loop circuit so as to output a second phase control signal representing the phase control amount of said reception signal;

causing a first output circuit to control the phase of said reception signal based on said first phase control signal so as to output the phase-controlled signal;

causing a second output circuit to control the phase of said reception signal based on said second phase control signal so as to output the phase-controlled signal;

causing a first detection circuit to detect a phase control error in said first phase-locked loop circuit based on the phase-controlled signal output from said first output circuit;

causing a second detection circuit to detect a phase control error in said second phase-locked loop circuit based on the phase-controlled signal output from said second output circuit;

if the phase control error detected in said first phase-locked loop circuit by said first detection circuit is larger than the phase control error detected in said second phase-locked loop circuit by said second detection circuit, then establishing the same value as the loop gain of a second loop filter included in said second phase-locked loop circuit as the loop gain of a first loop filter included in said first phase-locked loop circuit; and holding a loop gain setting established as the loop gain of said first loop filter included in said first phase-locked loop circuit;

wherein said reception signal is structured in units of a frame made up of a plurality of slots transmitted in a plurality of transmission modes corresponding to different modulation techniques, and said loop gain setting is held for each of said transmission modes.

8. A reception system comprising:

an acquisition section configured to acquire a signal transmitted via a transmission channel; and a transmission channel decoding process section configured to perform processing including a synchronized detection process on the signal acquired by said acquisition section;

wherein said transmission channel decoding process section includes
- a first phase-locked loop circuit configured to output, based on an input reception signal, a first phase control signal representing a phase control amount of said reception signal,
- a second phase-locked loop circuit configured to input the same signal as said reception signal input to said first phase-locked loop circuit so as to output a second phase control signal representing the phase control amount of said reception signal,
- a first output circuit configured to control the phase of said reception signal based on said first phase control signal so as to output the phase-controlled signal,
- a second output circuit configured to control the phase of said reception signal based on said second phase control signal so as to output the phase-controlled signal,
- a first detection circuit configured to detect a phase control error in said first phase-locked loop circuit based on the phase-controlled signal output from said first output circuit,
- a second detection circuit configured to detect a phase control error in said second phase-locked loop circuit based on the phase-controlled signal output from said second output circuit,
- a control circuit configured such that if the phase control error detected in said first phase-locked loop circuit by said first detection circuit is larger than the phase control error detected in said second phase-locked loop circuit by said second detection circuit, then said control circuit establishes the same value as the loop gain of a second loop filter included in said second phase-locked loop circuit as the loop gain of a first loop filter included in said first phase-locked loop circuit, and
- a holding section configured to hold a loop gain setting established as the loop gain of said first loop filter included in said first phase-locked loop circuit, said reception signal is structured in units of a frame made up of a plurality of slots transmitted in a plurality of transmission modes corresponding to different modulation techniques, and said holding section holds said loop gain setting for each of said transmission modes.

9. A receiving system comprising:
a transmission channel decoding process section configured to perform processing including a synchronized detection process on a signal acquired via a transmission channel; and
an information source decoding process section configured to decode the signal having undergone the processing performed by said transmission channel decoding process section, into data targeted for transmission;
wherein said transmission channel decoding process section includes
- a first phase-locked loop circuit configured to output, based on an input reception signal, a first phase control signal representing a phase control amount of said reception signal,
- a second phase-locked loop circuit configured to input the same signal as said reception signal input to said first phase-locked loop circuit so as to output a second phase control signal representing the phase control amount of said reception signal,
- a first output circuit configured to control the phase of said reception signal based on said first phase control signal so as to output the phase-controlled signal,
- a second output circuit configured to control the phase of said reception signal based on said second phase control signal so as to output the phase-controlled signal,
- a first detection circuit configured to detect a phase control error in said first phase-locked loop circuit based on the phase-controlled signal output from said first output circuit,
- a second detection circuit configured to detect a phase control error in said second phase-locked loop circuit based on the phase-controlled signal output from said second output circuit,
- a control circuit configured such that if the phase control error detected in said first phase-locked loop circuit by said first detection circuit is larger than the phase control error detected in said second phase-locked loop circuit by said second detection circuit, then said control circuit establishes the same value as the loop gain of a second loop filter included in said second phase-locked loop circuit as the loop gain of a first loop filter included in said first phase-locked loop circuit, and
- a holding section configured to hold a loop gain setting established as the loop gain of said first loop filter included in said first phase-locked loop circuit, said reception signal is structured in units of a frame made up of a plurality of slots transmitted in a plurality of transmission modes corresponding to different modulation techniques, and said holding section holds said loop gain setting for each of said transmission modes.

10. A receiving system comprising:
a transmission channel decoding process section configured to perform processing including a synchronized detection process on a signal acquired via a transmission channel; and
an output section configured to output an image or a sound based on the signal having undergone the processing performed by said transmission channel decoding process section;
wherein said transmission channel decoding process section includes
- a first phase-locked loop circuit configured to output, based on an input reception signal, a first phase control signal representing a phase control amount of said reception signal,
- a second phase-locked loop circuit configured to input the same signal as said reception signal input to said first phase-locked loop circuit so as to output a second phase control signal representing the phase control amount of said reception signal,
- a first output circuit configured to control the phase of said reception signal based on said first phase control signal so as to output the phase-controlled signal,
- a second output circuit configured to control the phase of said reception signal based on said second phase control signal so as to output the phase-controlled signal,
- a first detection circuit configured to detect a phase control error in said first phase-locked loop circuit based on the phase-controlled signal output from said first output circuit,
- a second detection circuit configured to detect a phase control error in said second phase-locked loop circuit based on the phase-controlled signal output from said second output circuit,
- a control circuit configured such that if the phase control error detected in said first phase-locked loop circuit by said first detection circuit is larger than the phase control error detected in said second phase-locked loop circuit by said second detection circuit, then said control circuit establishes the same value as the loop gain of a second loop filter included in said second phase-locked loop circuit as the loop gain of a first loop filter included in said first phase-locked loop circuit, and a holding section configured to hold a loop gain setting established as the loop gain of said first loop filter included in said first phase-locked loop circuit, said reception signal is structured in units of a frame made up of a plurality of slots transmitted in a plurality of transmission modes corresponding to different modulation techniques, and said holding section holds said loop gain setting for each of said transmission modes.

11. A receiving system comprising:

a transmission channel decoding process section configured to perform processing including a synchronized detection process on a signal acquired via a transmission channel; and a recording section configured to record the signal having undergone the processing performed by said transmission channel decoding process section;

wherein said transmission channel decoding process section includes a first phase-locked loop circuit configured to output, based on an input reception signal, a first phase control signal representing a phase control amount of said reception signal, a second phase-locked loop circuit configured to input the same signal as said reception signal input to said first phase-locked loop circuit so as to output a second phase control signal representing the phase control amount of said reception signal, a first output circuit configured to control the phase of said reception signal based on said first phase control signal so as to output the phase-controlled signal, a second output circuit configured to control the phase of said reception signal based on said second phase control signal so as to output the phase-controlled signal, a first detection circuit configured to detect a phase control error in said first phase-locked loop circuit based on the phase-controlled signal output from said first output circuit, a second detection circuit configured to detect a phase control error in said second phase-locked loop circuit based on the phase-controlled signal output from said second output circuit, a control circuit configured such that if the phase control error detected in said first phase-locked loop circuit by said first detection circuit is larger than the phase control error detected in said second phase-locked loop circuit by said second detection circuit, then said control circuit establishes the same value as the loop gain of a second loop filter included in said second phase-locked loop circuit as the loop gain of a first loop filter included in said first phase-locked loop circuit, and a holding section configured to hold a loop gain setting established as the loop gain of said first loop filter included in said first phase-locked loop circuit, said reception signal is structured in units of a frame made up of a plurality of slots transmitted in a plurality of transmission modes corresponding to different modulation techniques, and said holding section holds said loop gain setting for each of said transmission modes.

* * * * *